(12) United States Patent
Chung Lee

(10) Patent No.: US 7,316,299 B1
(45) Date of Patent: Jan. 8, 2008

(54) BRAKE DEVICE FOR CHAIN SAW

(76) Inventor: Hsin-Chih Chung Lee, No. 21-8, Shang San Cho Woo, Wuchang-Li, Chungli City, Tai Yuan Hsien (TW)

( * ) Notice: Subject to any disclaimer, the term of this patent is extended or adjusted under 35 U.S.C. 154(b) by 0 days.

(21) Appl. No.: 11/610,734

(22) Filed: Dec. 14, 2006

(51) Int. Cl.
 *B60T 1/00* (2006.01)
(52) U.S. Cl. .......................................... 188/31; 188/265
(58) Field of Classification Search ................ 188/265, 188/31, 60, 30, 210
See application file for complete search history.

(56) References Cited

U.S. PATENT DOCUMENTS

| | | | |
|---|---|---|---|
| 5,848,550 A | 12/1998 | Cathcart et al. .................. | 74/2 |
| 6,782,627 B2 | 8/2004 | Hermes et al. ................ | 30/386 |
| 6,842,987 B1 | 1/2005 | Martinsson et al. .......... | 30/382 |
| 2002/0121411 A1 | 9/2002 | Ziegs ....................... | 188/77 W |
| 2005/0258683 A1 | 11/2005 | Yamaguchi .................. | 303/89 |

*Primary Examiner*—Devon Kramer
(74) *Attorney, Agent, or Firm*—Rabin & Berdo, P.C.

(57) ABSTRACT

A brake device for a chain saw is provided, wherein a driving shaft, which passes through a brake block, a torsion spring, a driving block and a chain wheel, is assembled with a driven gear, and two ends of the torsion spring are respectively fixed to the brake block and the driving block. The driven gear is loosely fit to the brake block, and the chain wheel is fixed to the driving shaft. When the driven gear is driven to rotate, the brake block, the driving shaft and the chain wheel are brought to rotate synchronously. When a force is applied to the brake block via a brake pin, the torsion spring will deform and separate from the driving block so that the driving block fails to transmit a driving force to the brake block, and thereby the braking effect is achieved.

2 Claims, 5 Drawing Sheets

BRAKE DEVICE FOR CHAIN SAW

BACKGROUND OF THE INVENTION

1. Field of the Invention

The present invention relates to a brake device for a powered chain saw.

2. The Prior Arts

A portable chain saw, which is powered by a diesel fuel engine, is commonly used in gardening and a logging activity. The engine drives a driving shaft, as well as a chain wheel and a chain connected to the driving shaft to rotate, such that a saw blade coupled to the chain can cut a work piece. As the engine is shut down, the driving shaft will continue rotating for a while because of the rotational inertia. Since the saw blade on the chain saw is very sharp, an accident may occur once the operator is careless.

For this reason, there are many related brake devices developed recently to reduce the risk of using the powered chain saw. When the engine is shut down, or even an accident occurs, the operator can use such a brake device to stop the rotation of the driving shaft immediately. However, the traditional brake devices for a powered chain saw have several disadvantages, such as excessive parts, complicated structure, heavy weight and high manufacturing cost.

SUMMARY OF THE INVENTION

A primary objective of the present invention is to provide a brake device for a chain saw, in which has less parts, simple structure, light weight and low manufacturing cost.

To achieve the above objective, the present invention is summarized in that a clutch device, which is composed of a driving block, at least one torsion spring and a brake block, is disposed in a central hole of a driven gear and passing by a driving shaft. One end of the torsion spring is closely fit into a recess of the driving block, and other end of the torsion spring has the driving block closely fit therein. The driven gear is loosely fit to the brake block, and a chain wheel is fixed to the driving shaft. When the driven gear is driven to rotate, a driving force transmitted by the driving block and the torsion spring brings the brake block and the driving shaft to rotate synchronously, so as to make the chain wheel rotate as well. When a force is applied to the brake block via a brake pin, the torsion spring deforms and its external diameter reduces because of the rotational inertia of the driving block to make the torsion spring separate from the driving block, such that the driving block fails to transmit the driving force to rotate the brake block.

Compared with the conventional brake device for a chain saw, the brake device in accordance with the present invention can reduce the overall weight and the manufacturing cost because of its less parts and simple structure.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
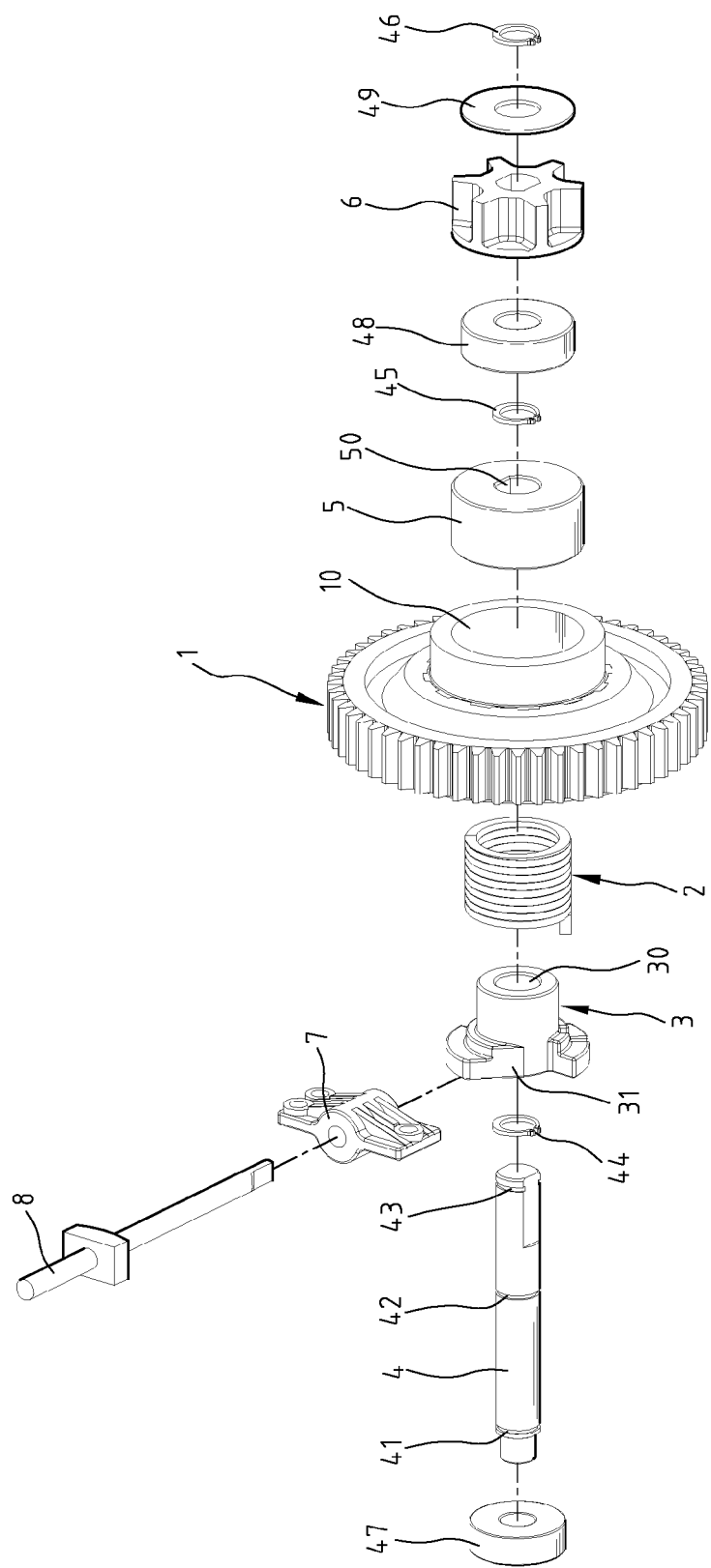
FIG. 1 is a perspective exploded view of a brake device for a chain saw in accordance with the present invention.
Figure 2:
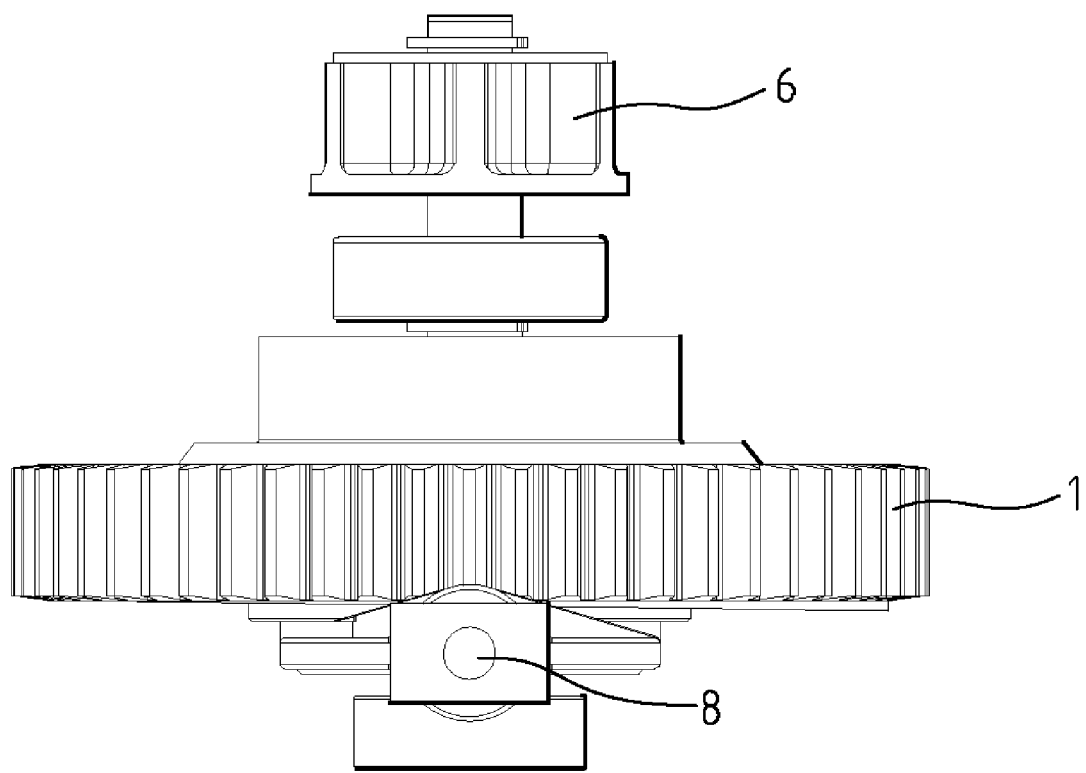
FIG. 2 is a top assembled view of FIG. 1.
Figure 3:
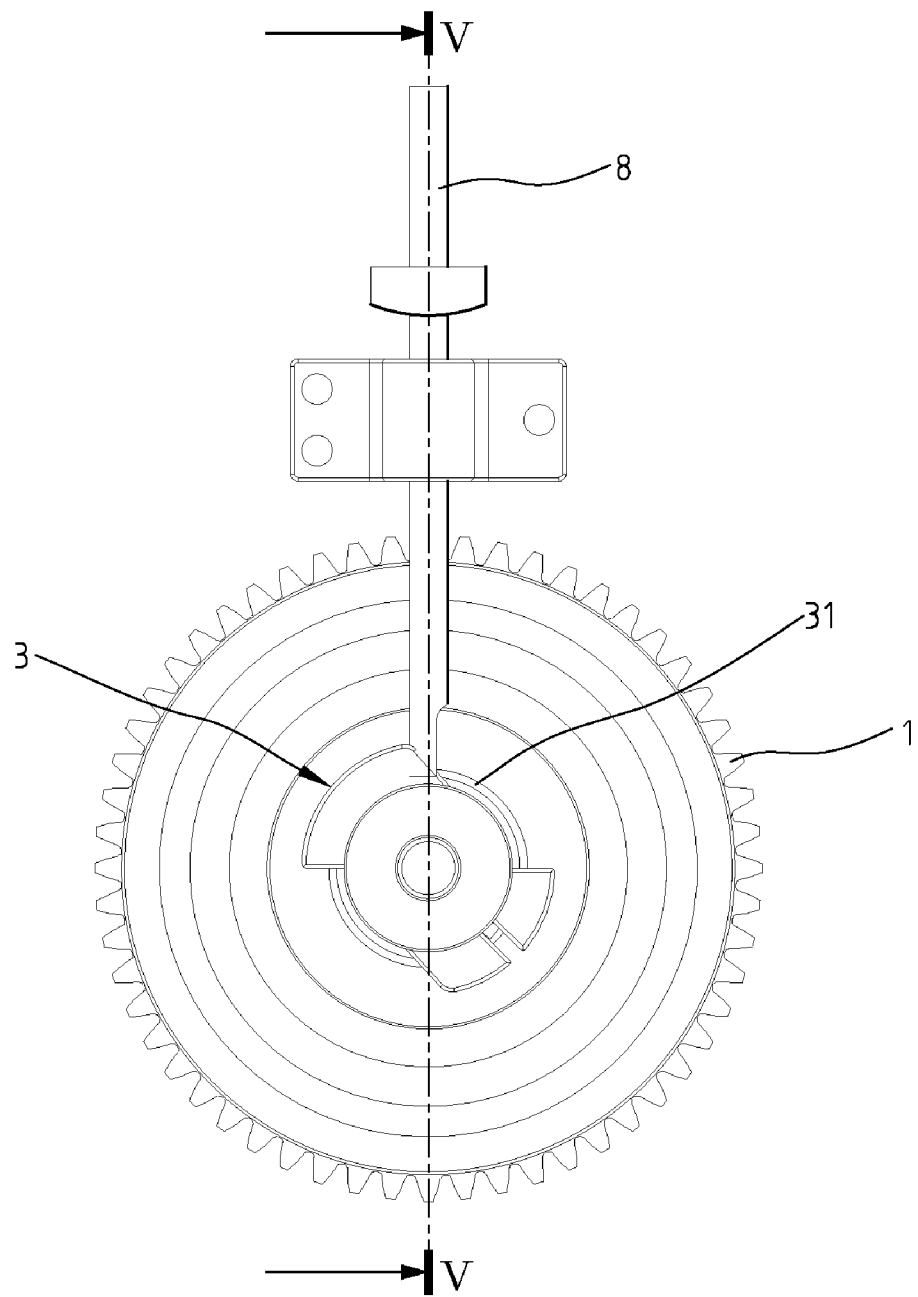
FIG. 3 is a front assembled view of FIG. 1.
Figure 4:
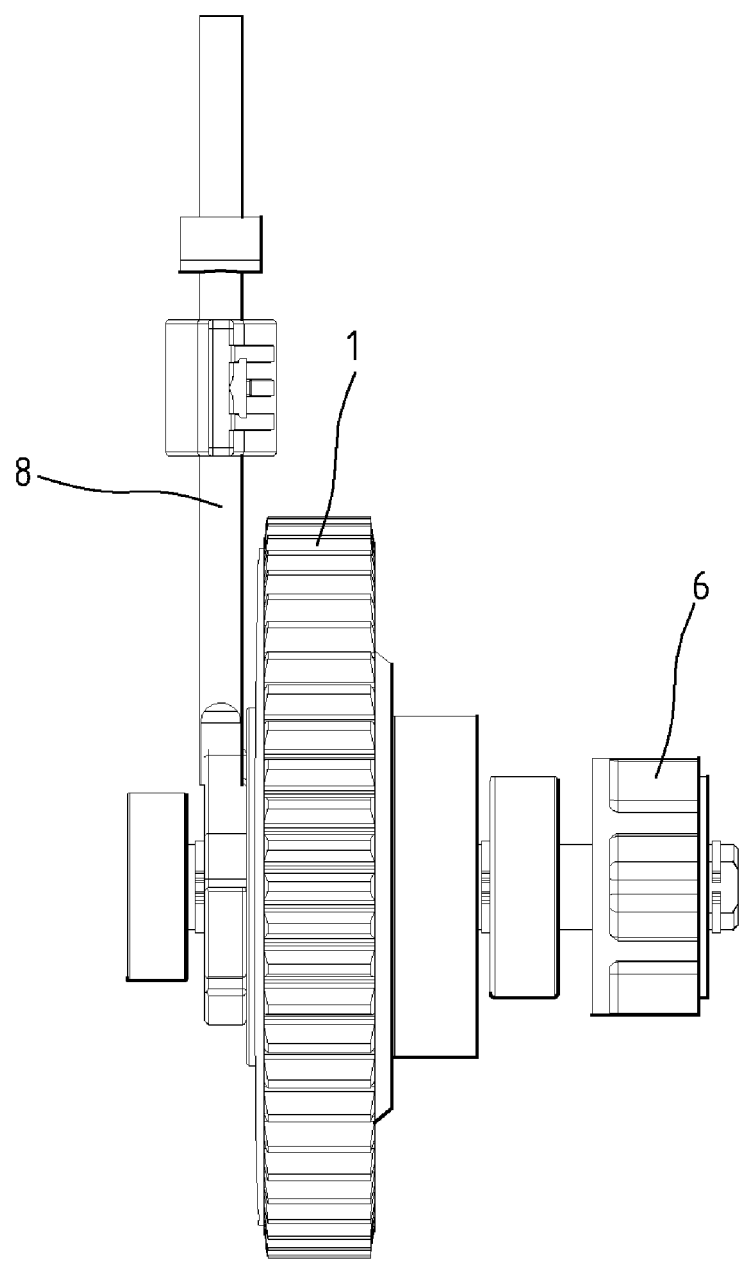
FIG. 4 is a side assembled view of FIG. 1.
Figure 5:
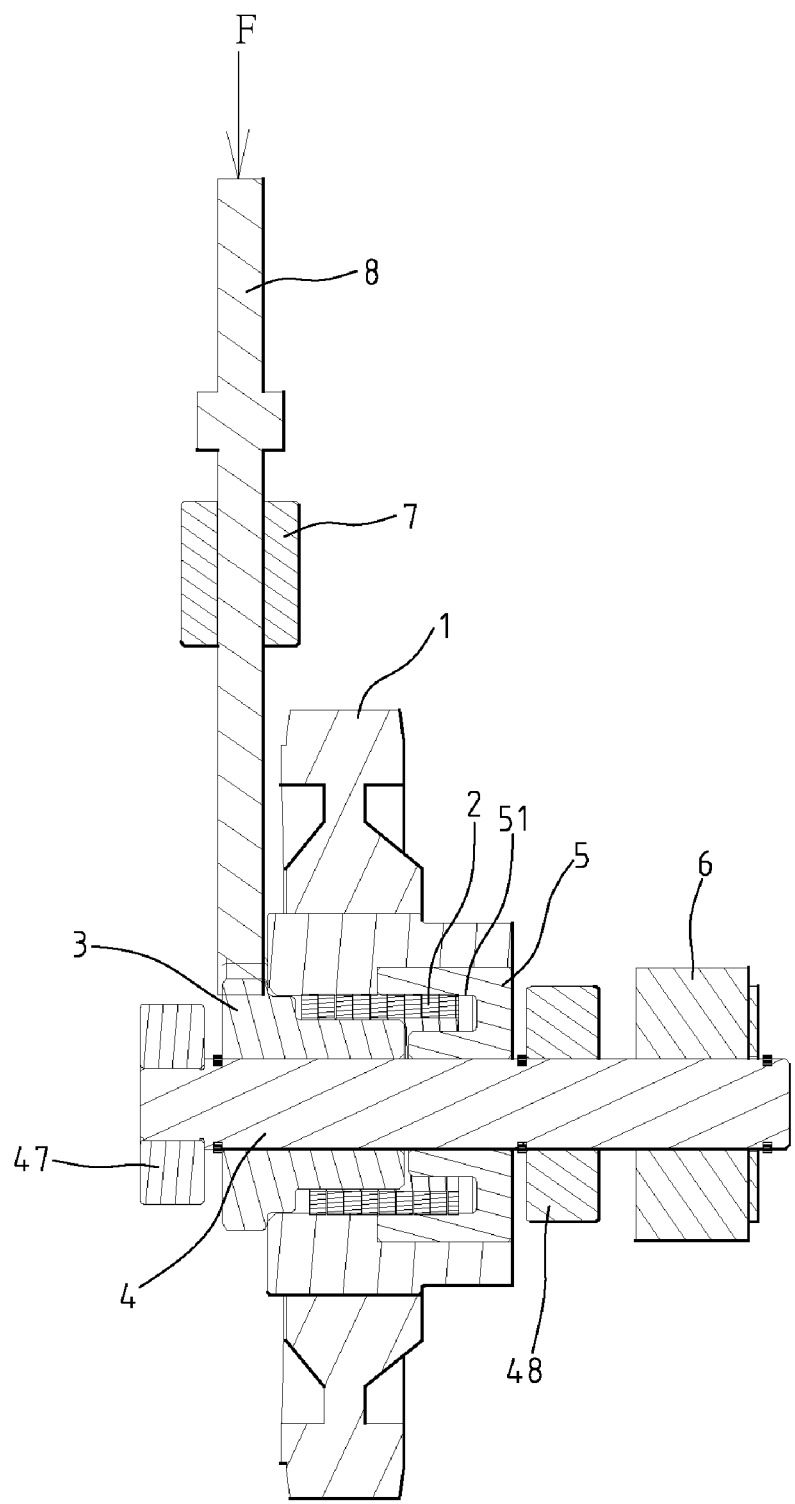
FIG. 5 is a sectional view taken along the line V-V of FIG. 3.

Referring to FIG. 1, a brake device for a chain saw in accordance with present invention, comprising a driven gear 1 having a central hole 10, a torsion spring 2, a brake block 3 having a through hole 30, a driving shaft 4, a driving block 5, a chain wheel 6, and a brake pin 8. Wherein, the driven gear 1 is engaged with a driving gear (not shown) and is driven to rotate by the driving gear. The driving block 5 has a through hole 50 defined in a center thereof and a recess 51 defined on one end thereof (shown in FIG. 5). The driving block 5 is fixed in the central hole 10 of the driven gear 1.

The brake block 3 is preferably a cylinder and has a groove 31 at a proper position of an outer circumference thereof.

The driving shaft 4 has a first annular groove 41, a second annular groove 42, and a third annular groove 43 properly defined on the outer circumference thereof. After the driving shaft 4 passes through the brake block 3, the torsion spring 2 and the driving block 5 in order, a first snap ring 44 and a second snap ring 45 are secured in the first annular groove 41 and the second annular groove 42 respectively so that the brake block 3, the torsion spring 2 and the driving block 5 are assembled together and prevented from disengaging from the driving shaft 4. Then, the driving shaft 4 passes through the central hole 10 of the driven gear 1, and the driving block 5 is fixed in the central hole 10. At the same time, one end of the torsion spring 2 is closely fit into the recess 51 of the driving block 5, and the other end of the torsion spring 2 has the driving block 3 closely fit therein. The driven gear 1 is loosely fit to the brake block 3. The brake block 3 is fixed to the driving shaft 4. A first bearing 47 and a second bearing 48 are respectively mounted on both ends of the driving shaft 4. The chain wheel 6 is fixed on the driving shaft 4, and then a gasket 49 further sleeved on the driving shaft 4, and a third snap ring 46 is secured in the third annular groove 43 to prevent the chain wheel 6 from disengaging from the driving shaft 4.

Furthermore, the preset invention further provides a brake pin 8 for applying a force on the brake block 3. The brake pin 8 is a rod. After the brake pin 8 passes through a brake pin holder 7, the brake pin holder 7 is installed on a main body of a chain saw (not shown) in such a manner that an end of the brake pin 8 is corresponding to the brake block 3. The assembled structure of the brake device is shown in FIGS. 2-5.

During the operation, an engine provided in the main body of a chain saw drives a driving gear to rotate, which in turn drives the driven gear 1 and the driving block 5 to rotate synchronously. Because the torsion spring 2 is closely fit into the recess 51 of the driving block 5, the friction between the torsion spring 2 and the driving block 5 can drive the torsion spring 2 to rotate. Besides, the torsion spring 2 has the brake block 3 closely fit therein so that the torsion spring 2 can drive the brake block 3 to rotate. Thus, the rotation of the driving shaft 4 can drive the chain wheel 6 as well as a chain (not shown) to rotate. When an operator applies a force F on the brake pin 8 (see FIG. 5), the brake pin 8 moves in an axial direction and inserts into the groove 31 of the brake block 3, whereby the brake block 3 can be locked and stop rotating. Accordingly, the torsion spring 2 will be deformed and its external diameter will reduce because of the rotational inertia to make the torsion spring 2 separate from the driving block 5. The torsion spring 2 fails to deliver the driving force to the brake block 3, so as to achieve the braking effect.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A brake device for a chain saw, comprising:
    a driven gear having a central hole;
    a driving block fixed in the central hole of the driven gear and having a recess;
    a torsion spring;
    a brake block;
    a chain wheel;
    a driving shaft passing through the brake block, the torsion spring, the driven gear, the driving block and the chain wheel in order, wherein one end of the torsion spring is closely fit into the recess of the driving block, the other end of the torsion spring has the driving block closely fit therein, the driven gear is loosely fit to the brake block, and the chain wheel is fixed to the driving shaft; and
    a brake pin capable of applying a force on the brake block.

2. The brake device for a chain saw as claimed in claim 1, wherein the brake block has a groove defined on an outer circumference thereof into which the brake pin is able to be inserted.

* * * * *